United States Patent
Murphy et al.

(10) Patent No.: US 10,899,549 B2
(45) Date of Patent: Jan. 26, 2021

(54) INTERFERENCE FIT CENTER HEAD FOR HYDRAULIC CYLINDER

(71) Applicant: Keith Manufacturing Co., Madras, OR (US)

(72) Inventors: Jared Murphy, Madras, OR (US); Tim Toth, Madras, OR (US)

(73) Assignee: Keith Manufacturing Co., Madras, OR (US)

( * ) Notice: Subject to any disclaimer, the term of this patent is extended or adjusted under 35 U.S.C. 154(b) by 0 days.

(21) Appl. No.: 16/537,877

(22) Filed: Aug. 12, 2019

(65) Prior Publication Data

US 2020/0109008 A1 Apr. 9, 2020

Related U.S. Application Data

(62) Division of application No. 15/884,123, filed on Jan. 30, 2018, now abandoned.

(60) Provisional application No. 62/452,641, filed on Jan. 31, 2017.

(51) Int. Cl.
*B65G 25/04* (2006.01)
*B65G 25/08* (2006.01)
*B65G 25/06* (2006.01)

(52) U.S. Cl.
CPC ........ *B65G 25/065* (2013.01); *B65G 2811/09* (2013.01)

(58) Field of Classification Search
CPC ....... B65G 25/04; B65G 25/065; B65G 25/08
USPC ..................... 198/750.5, 750.6, 750.7, 750.8
See application file for complete search history.

(56) References Cited

U.S. PATENT DOCUMENTS

| | | | | | |
|---|---|---|---|---|---|
| 4,184,587 | A | * | 1/1980 | Hallstrom | B65G 25/065 198/750.2 |
| 5,064,052 | A | * | 11/1991 | Foster | B65G 25/065 198/750.3 |
| 5,222,593 | A | * | 6/1993 | Quaeck | B65G 25/065 198/750.5 |
| 5,340,264 | A | * | 8/1994 | Quaeck | B65G 25/065 198/750.5 |
| 5,383,548 | A | * | 1/1995 | Quaeck | B65G 25/065 198/750.6 |
| 5,638,943 | A | * | 6/1997 | Foster | B65G 25/065 198/750.2 |
| 5,799,778 | A | * | 9/1998 | Quaeck | B65G 25/065 198/750.5 |
| 5,934,445 | A | * | 8/1999 | Foster | B65G 25/065 198/750.2 |
| 6,003,660 | A | * | 12/1999 | Foster | B65G 25/065 198/750.5 |
| 6,056,113 | A | * | 5/2000 | Foster | B65G 25/065 198/750.5 |
| 7,028,832 | B2 | * | 4/2006 | Foster | B65G 25/065 198/750.2 |
| 7,243,779 | B2 | * | 7/2007 | Foster | B65G 25/065 198/750.1 |
| 7,380,652 | B2 | * | 6/2008 | Foster | B65G 25/065 198/750.5 |
| 7,556,141 | B2 | * | 7/2009 | Foster | B65G 25/065 198/750.1 |

(Continued)

*Primary Examiner* — Douglas A Hess
(74) *Attorney, Agent, or Firm* — Bruce A. Kaser (57) ABSTRACT

A hydraulic cylinder for a drive unit assembly for a reciprocating floor slat conveyor system has a single tubular barrel divided into two chambers by a center head or plug. The center head is held in position by shrink fitting it into the barrel.

1 Claim, 16 Drawing Sheets

(56) References Cited

U.S. PATENT DOCUMENTS

| | | | | |
|---|---|---|---|---|
| 7,886,891 B2* | 2/2011 | Ranger | ............... | B65G 47/82 |
| | | | | 198/370.01 |
| 8,006,828 B2* | 8/2011 | Stout | ............... | B65G 25/065 |
| | | | | 198/750.4 |
| 9,266,682 B1* | 2/2016 | Pistacchio | ............ | B65G 25/065 |
| 2018/0222684 A1* | 8/2018 | Cook et al. | | |

* cited by examiner

INTERFERENCE FIT CENTER HEAD FOR HYDRAULIC CYLINDER

This is a divisional filing that claims an improved hydraulic cylinder that was originally disclosed in earlier filings. This filing claims priority on U.S. Provisional Application No. 62/452,641 and U.S. Utility application Ser. No. 15/884,123, with all of the contents of these two applications being incorporated into the present application by reference

TECHNICAL FIELD

Background

The drive unit generally disclosed here is "all-aluminum." Whereas, many of the operations of the disclosed drive unit are the same as, or similar to, drive units designed in the past, the "all-aluminum" design disclosed here offers certain advantages.

Manufacturing the drive unit from aluminum, in lieu of conventional steel, offers significant weight advantages that can either increase the load carrying capacity of a trailer or otherwise allow for improvements that might otherwise reduce load-carrying capacity. With respect to the latter point, persons familiar with reciprocating floor slat systems that are built into trailer floors also know that total gross weight of a trailer is important to the freight hauler. For this reason, it is generally more desirable to reduce weight rather than to add weight. However, adding design improvements to the drive units of reciprocating floor slat systems tends to increase weight. By making a drive unit from aluminum, rather than steel, the weight savings attributable to aluminum can offset weight gains caused by other improvements, thereby offering the opportunity to enhance the reliability of drive unit systems without a significant weight cost to the freight hauler.

In recent years, the construction of truck trailers has transitioned from steel to aluminum. This change makes an aluminum drive unit more suitable, because the drive unit-to-trailer connections result in aluminum-to-aluminum mounts instead of aluminum-to-steel mounts, the latter being less desirable. Therefore, changes in trailer construction have created a need for a successful aluminum drive unit design.

One advantage to an all-aluminum drive unit (according to the design described here) is that it eliminates welds on drive unit "cross-drives."

In conventional steel drive units, what persons commonly call the "drive shoe" is welded to a steel cross drive at a number of locations across the cross drive. In addition, the piston rod connections to the steel cross drive involve welded components on the cross drive.

Welded components that are subjected to repeated load stresses create a point of mechanical failure over an extended period of time. In addition, the time and labor involved in welding drive unit components together represents a significant manufacturing cost. According to the present disclosure, it is possible to mill cross drives from solid blocks of forged aluminum and completely eliminate welds.

As part of the manufacturing process, by milling cross drives, it also makes it possible to reduce the overall height of the drive unit, with respect to the vertical offset of the hydraulic cylinders that move floor slats and the point of moving force that is applied to floor slats. In other words, the improved drive unit disclosed here manages to reduce moment forces and torque.

In the all-aluminum design, drive shoes are mounted to the cross-drives by bolts. This eliminates the need for the welding jigs that have been used in the past, in that bolt holes can be pre-drilled through the cross drive at the location where it is desired to attach the drive shoe. As an example, if there is a design change that requires different placement of drive shoes on the cross-drive, with the current design, there is no longer a need to build a new welding jig specific to the design.

SUMMARY

Included in the design is an improved hydraulic cylinder designed for the drive unit. The cylinder has a single barrel tube portion that is divided into two chambers by a center head or plug. The center head or plug is "shrink fit" inside the cylinder to fix it in position, thereby reducing or eliminating welding in the cylinder.

As is apparent from the attached images and drawings, the design disclosed here has other improvements.

BRIEF DESCRIPTION OF THE DRAWINGS

The following is a general description of the attached images and drawings.

DETAILED DESCRIPTION

Figure 1:
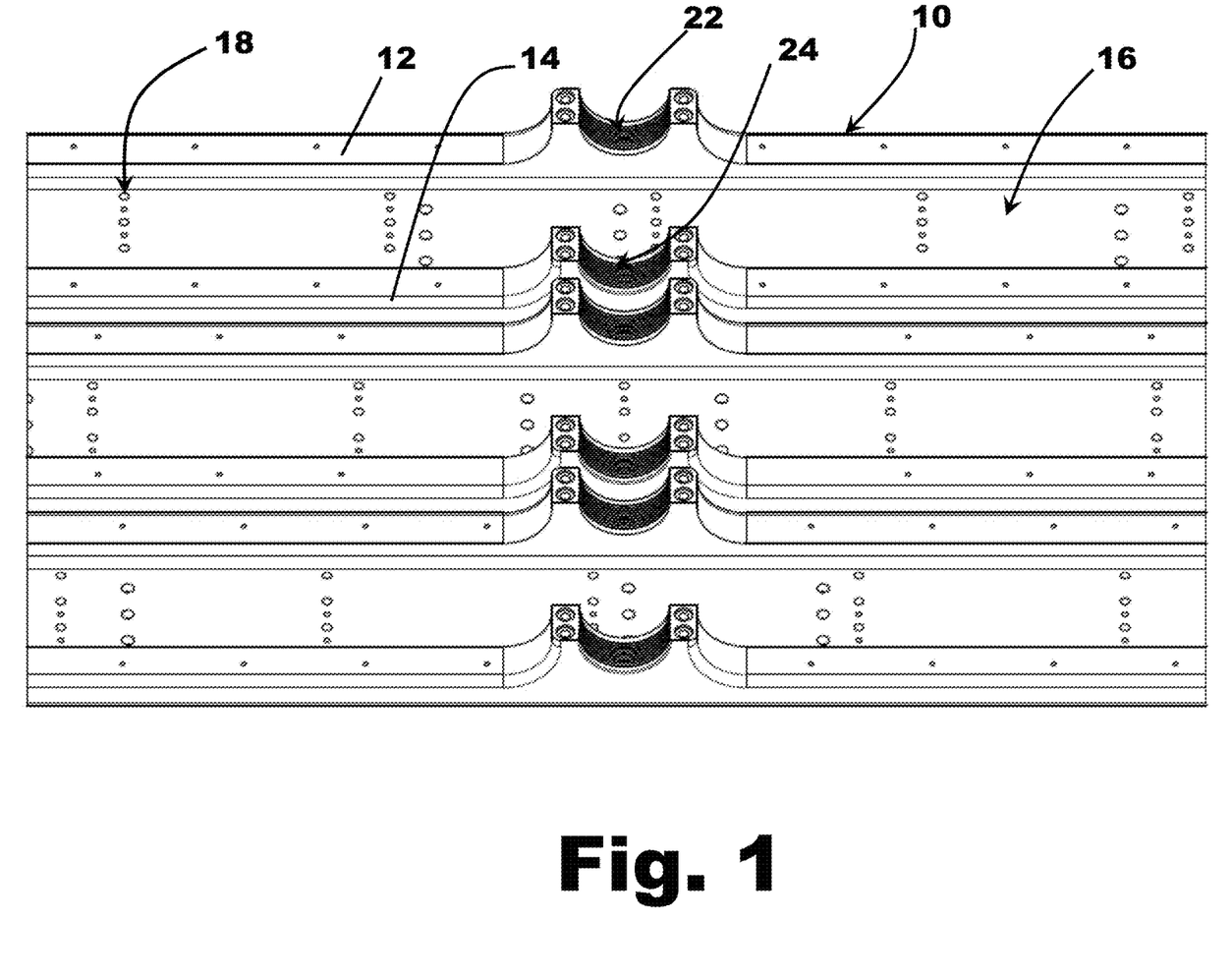
FIG. 1 is a pictorial image of three milled aluminum cross drives for a drive unit, with each cross-drive having an integrated cylinder clamp with grooves that our machined into the cross-drive. The side or stiffening ribs are also milled or extruded into the cross drive. Bolt openings or other openings can be drilled at any location needed for drive shoes.

Referring now to FIG. 1 in the illustrations, reference number 10 generally points to three side-by-side cross-drive members that are typically connected to a series of three hydraulic cylinders in a drive unit that is used in a reciprocating floor conveyor system. A person skilled in the art would be familiar with the nature and operation of the drive unit in the context of reciprocating floor conveyor systems.

Figure 4:
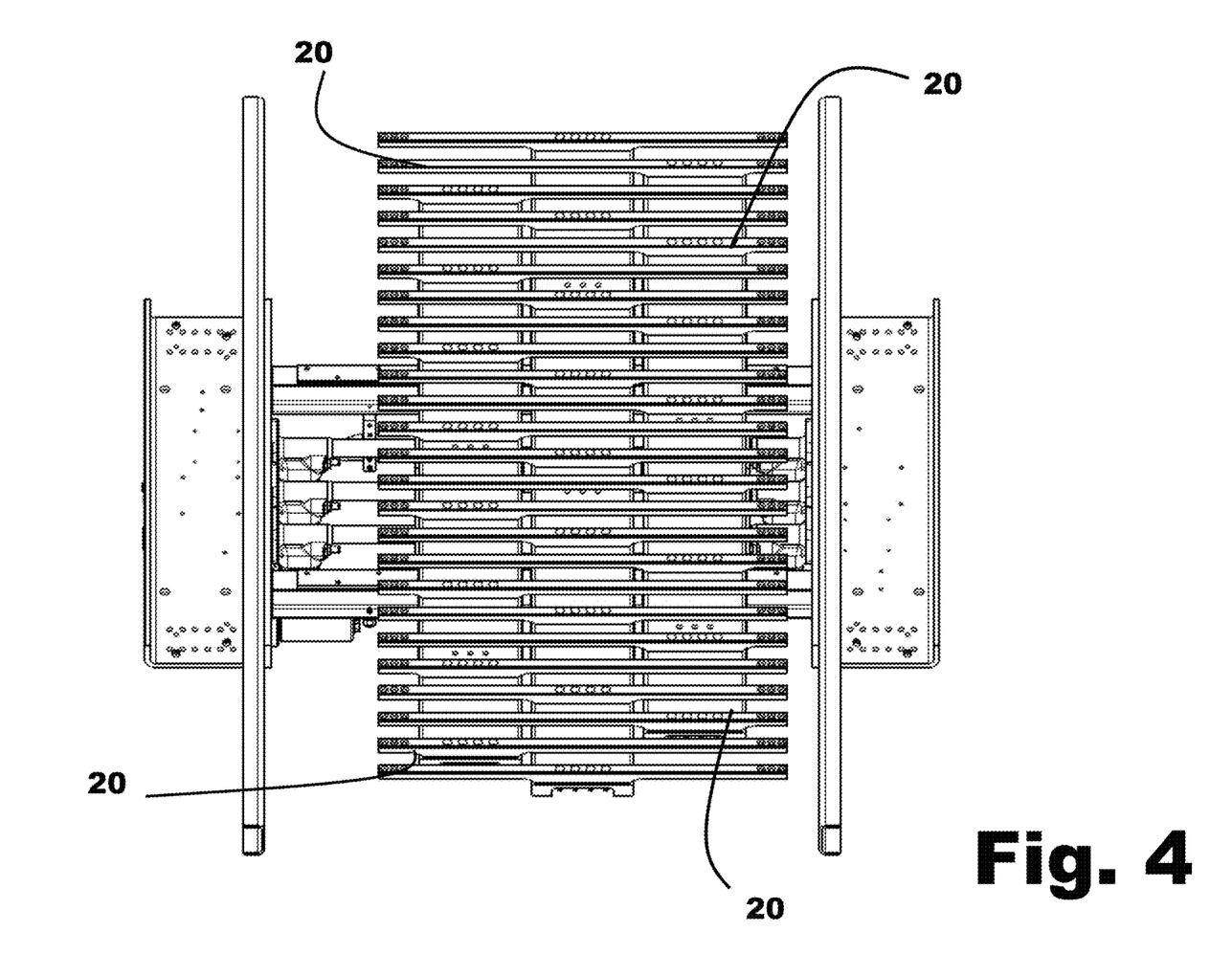
FIG. 4 is a pictorial image of the aluminum cross drives integrated in a drive unit system.

In this case, the cross-drive member 10 is extruded or milled from a single piece of aluminum. It has opposite side ribs 12, 14 on a lower side thereof (the lower side is generally indicated by number 16. A series of bolt holes (generally indicated by number 18 can be drilled through the body of the cross-drive member 10 for the attachment of drive shoes (number 20 in FIG. 4).

Figure 2:
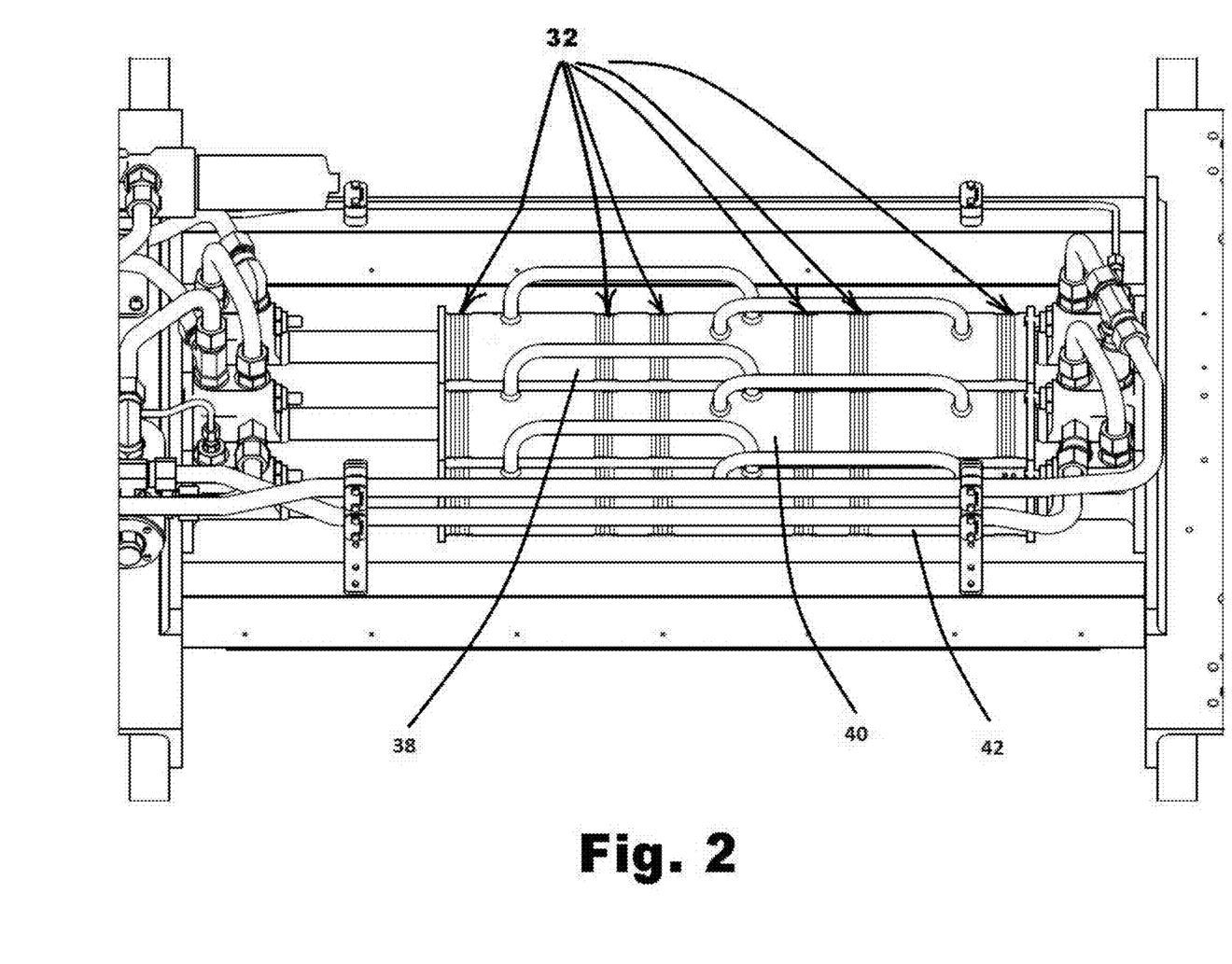
FIG. 2 is a pictorial image of an aluminum drive unit with cross-drives missing. The hydraulic cylinders have grooves that are machined to match the aluminum cross-drives.

Also, in the embodiment illustrated in FIG. 1, it can be seen that a hydraulic cylinder cradle 22 is also integrated into the cross-drive member 10. In this particular embodiment, the cradle 22 has grooves in the region generally indicated by 24 that mate with similar grooves on the outer surfaces of the hydraulic cylinders (see, generally, arrows 38, 40, 42 in FIG. 2), with the grooves on the cylinders generally indicated by arrows 32 in FIG. 2.

Figure 3:
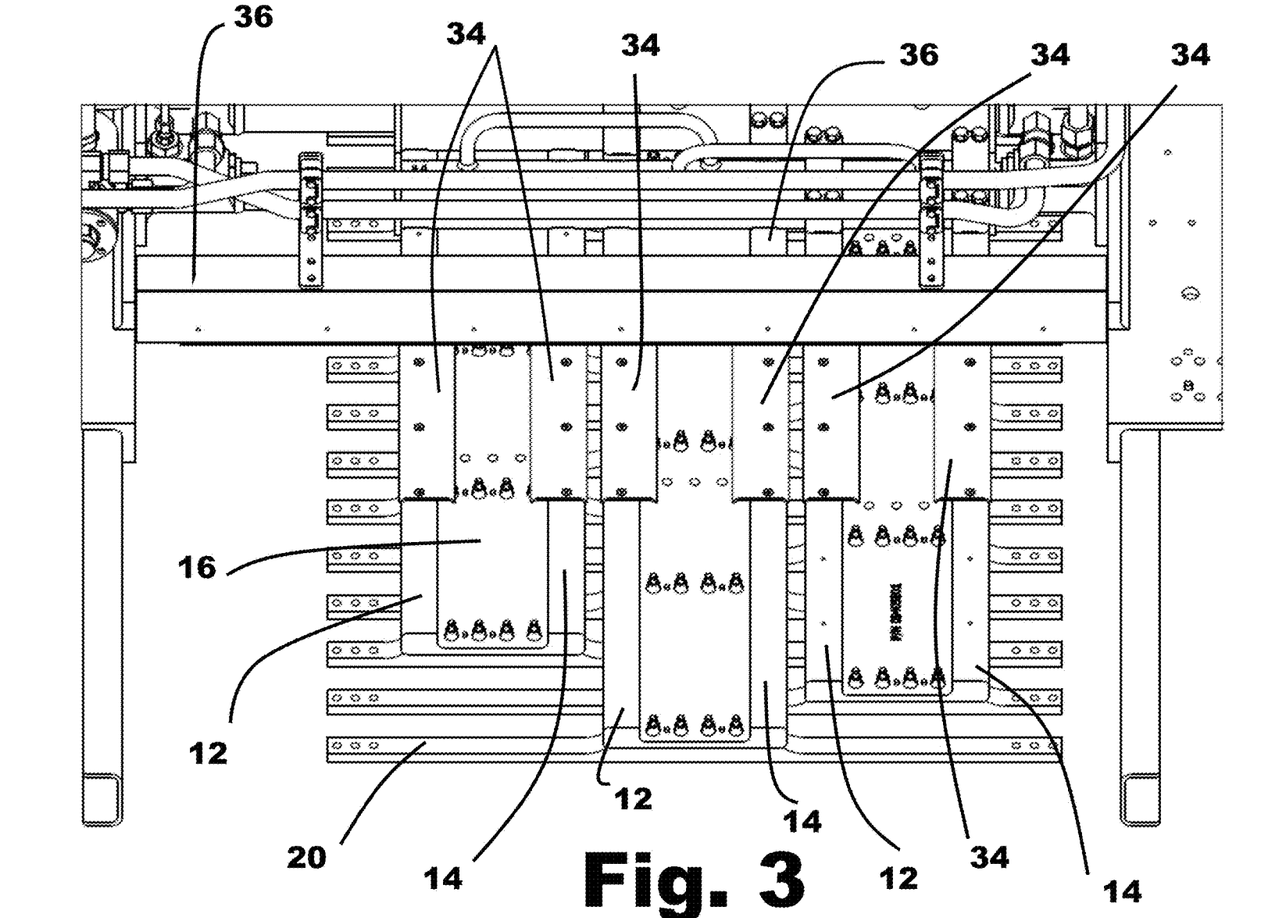
FIG. 3 is a pictorial image of the underside of the aluminum cross-drives shown in FIG. 1 and show cross-drive wear plates.

Referring now to FIG. 3, the lower side 16 of the cross-drive members 10 may have steel wear plates 34, attached to the ribs 12, 14. This assists in wear prevention should the cross-drives 10 slide against underlying support beams 36.

Figures 5A, 5B, 5C:
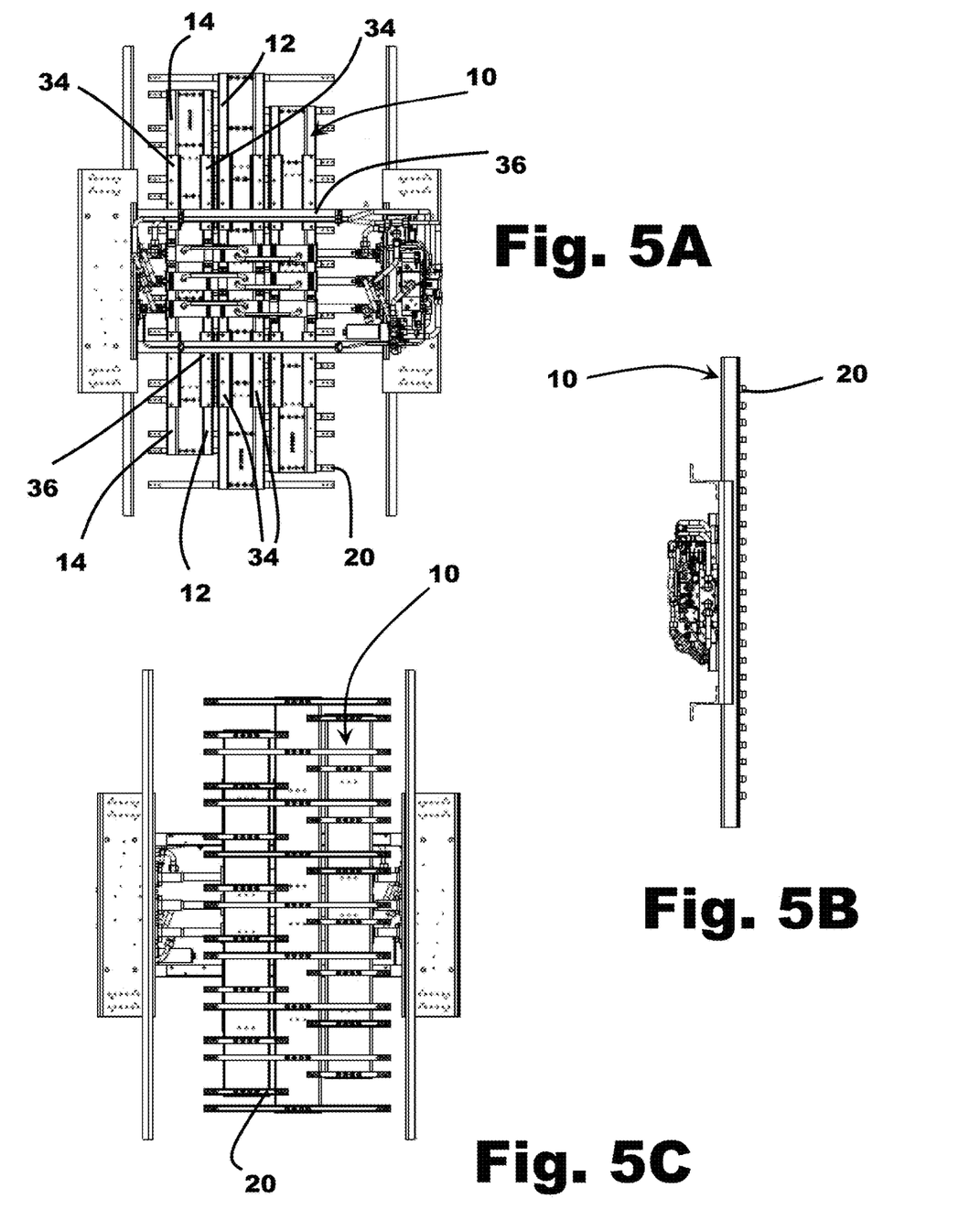
FIG. 5A is a bottom view of the drive unit system shown in FIG. 4.
FIG. 5B is an end view of the drive unit system shown in FIG. 4.
FIG. 5C is a top view of the drive unit shown in FIG. 4.
Figure 6:
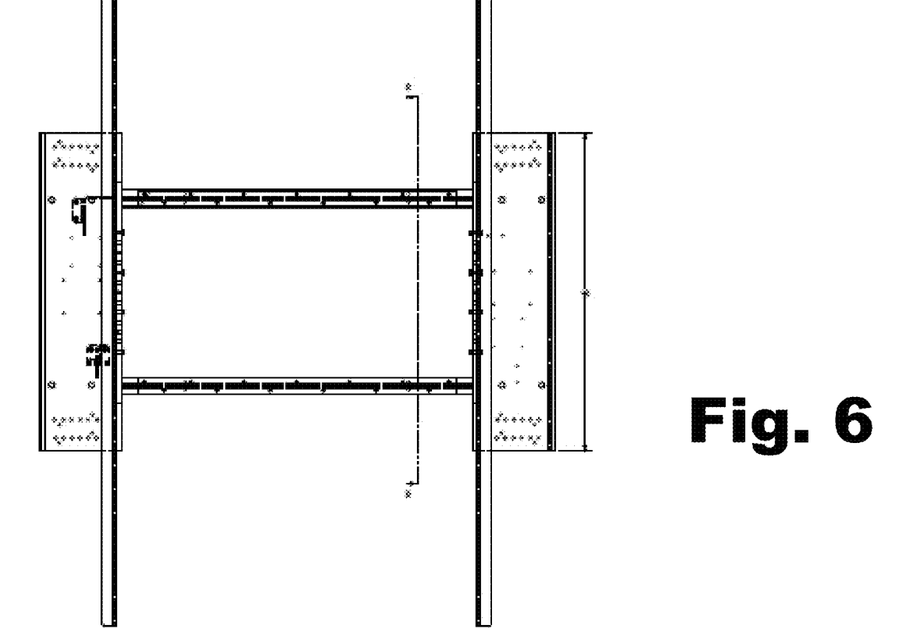
FIG. 6 is a bottom view of the frame portion of the drive unit system shown in FIG. 4.
Figure 7:
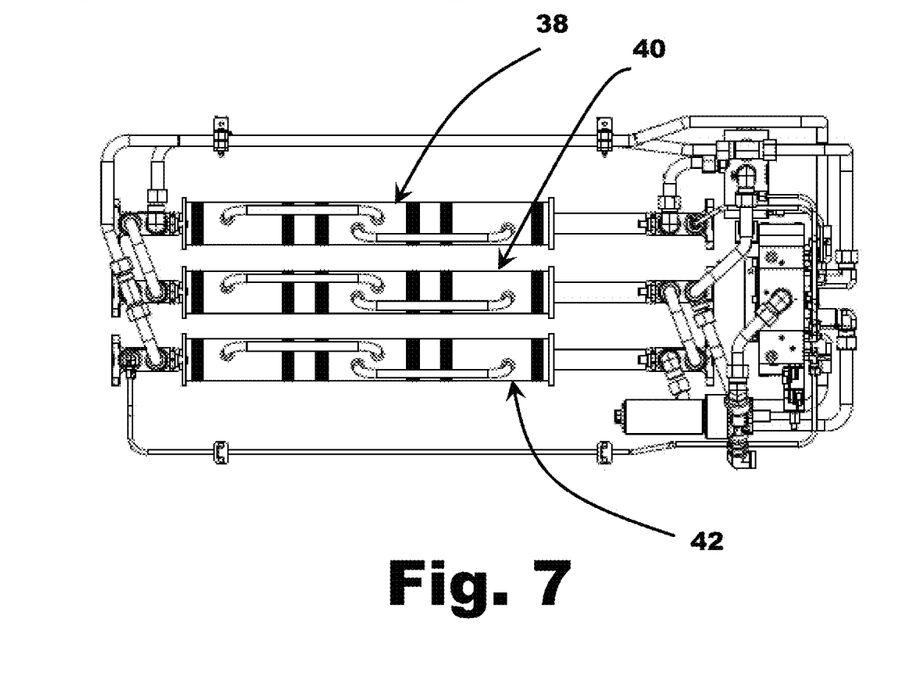
FIG. 7 illustrates the hydraulic drive package for the drive unit system shown in FIG. 4, and illustrates the drive unit's cylinders, valve assemblies, pressure filter, and tubing.
Figure 8:
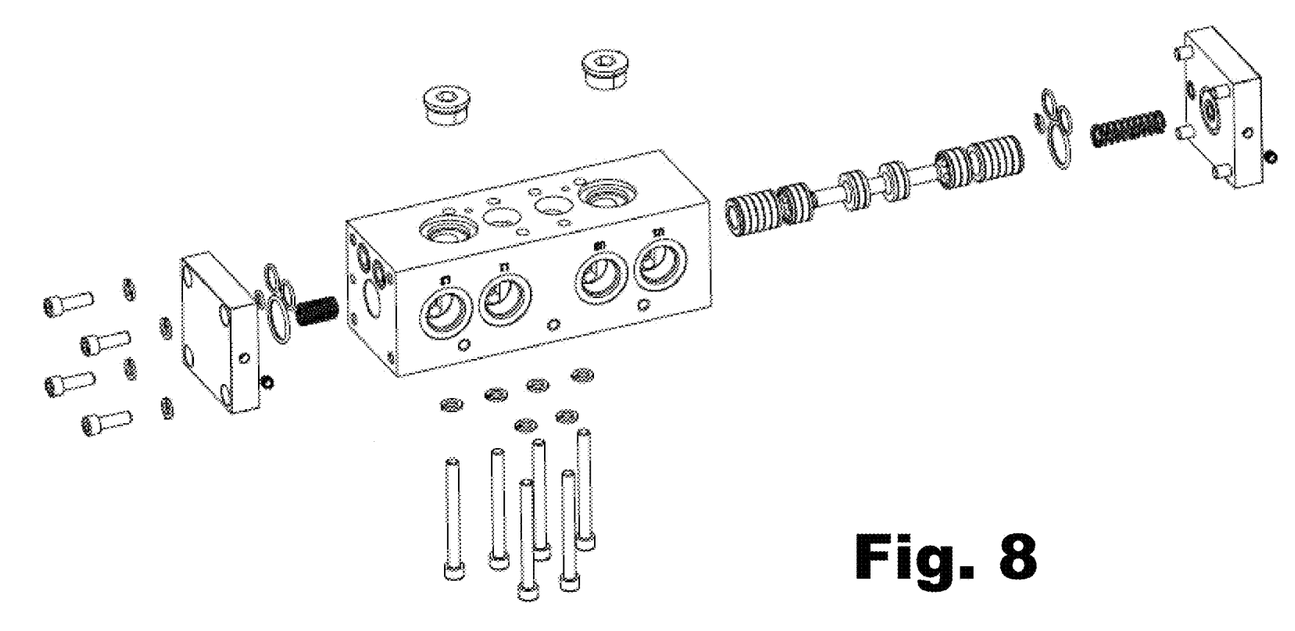
FIG. 8 is an exploded view of control and switching valve assembly.
Figure 9:
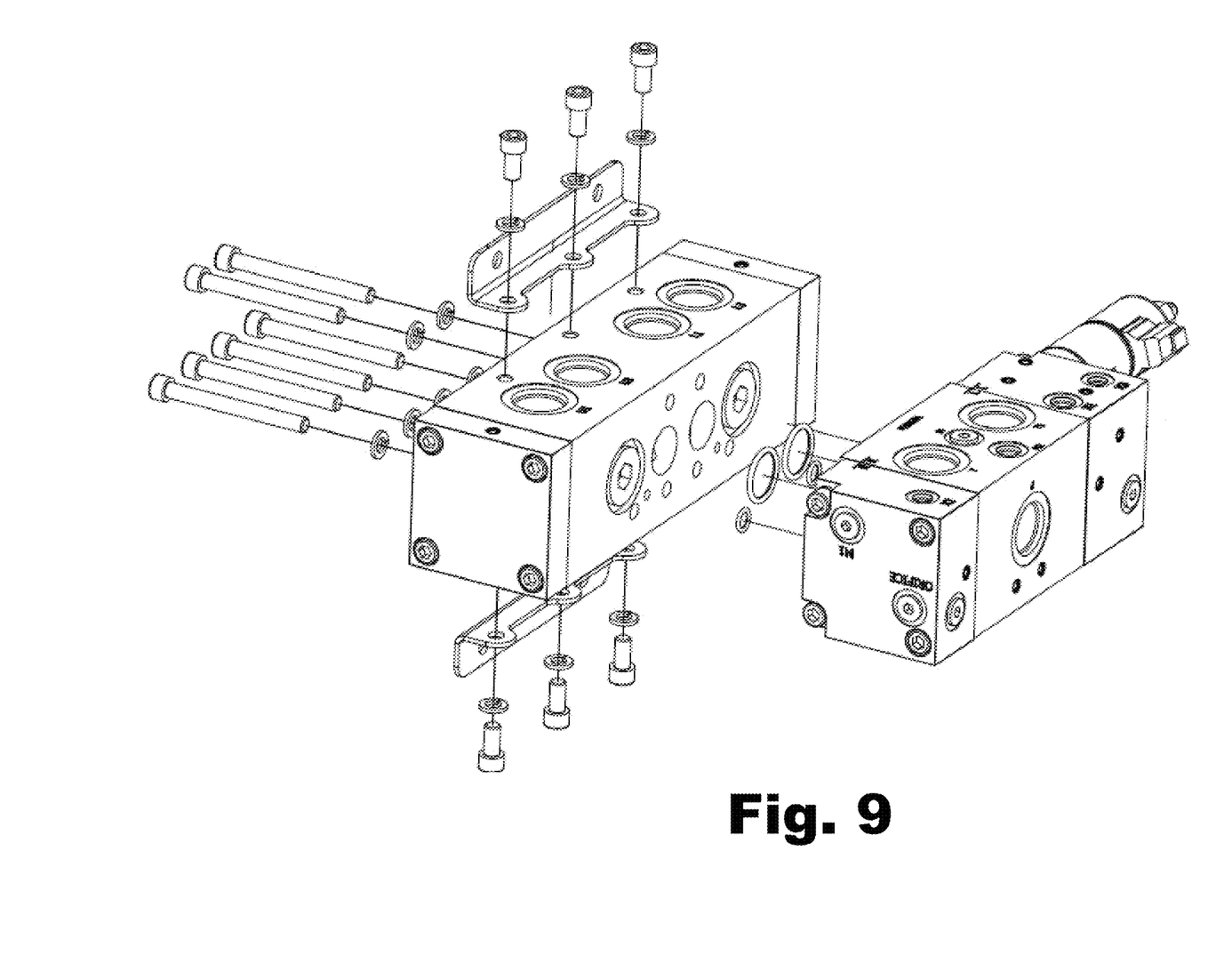
FIG. 9 is an exploded view of an integrated valve assembly.
Figure 10:
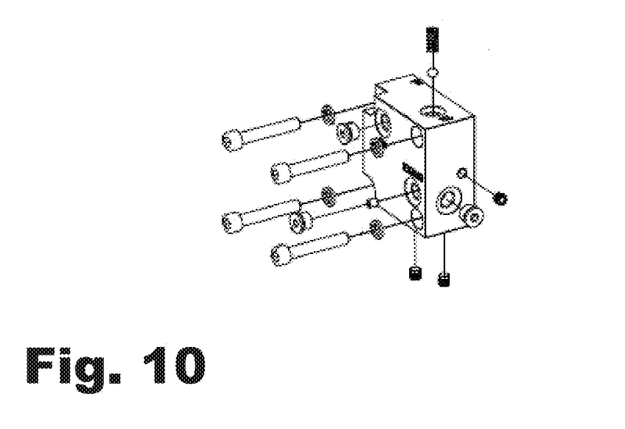
FIG. 10 is an exploded view of a switching valve assembly.
Figure 10A:
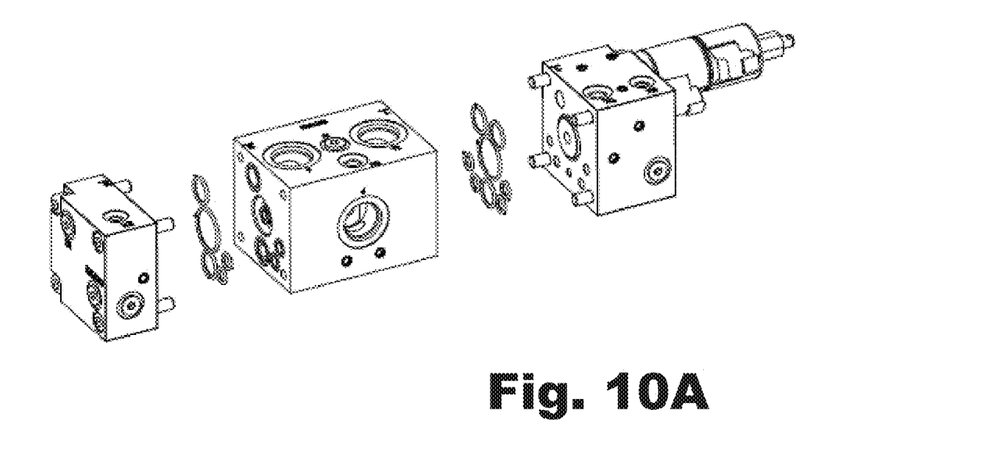
FIG. 10A is an exploded view of the left-hand portion of the switching valve assembly shown in FIG. 10.
Figure 10B:
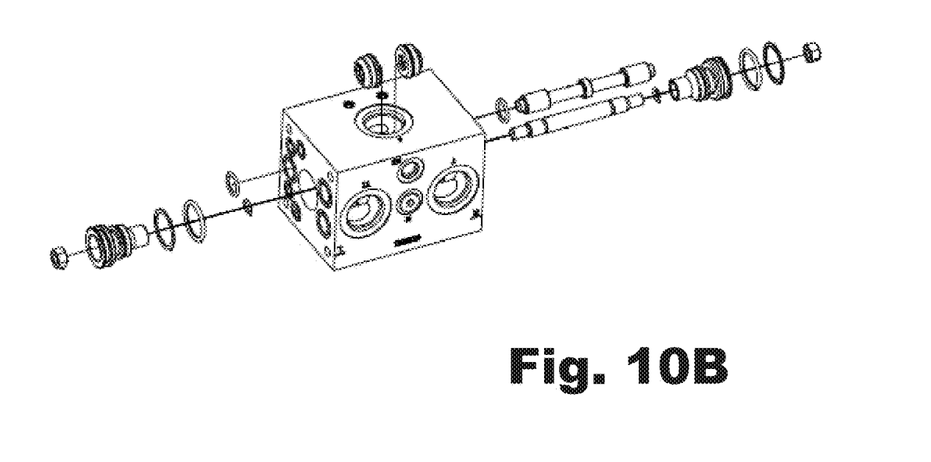
FIG. 10B is an exploded view of the central portion of the switching valve assembly shown in FIG. 10.
Figure 10C:
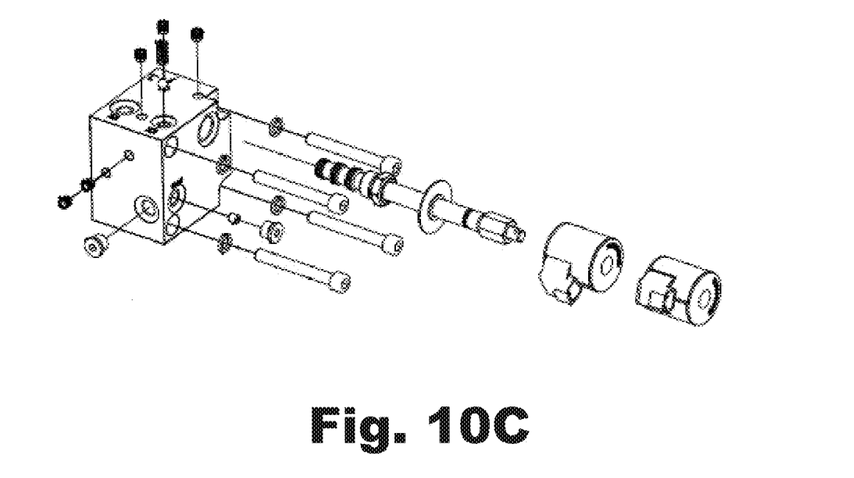
FIG. 10C is an exploded view of the right-hand portion of the switching valve assembly shown in FIG. 10.
Figure 11:
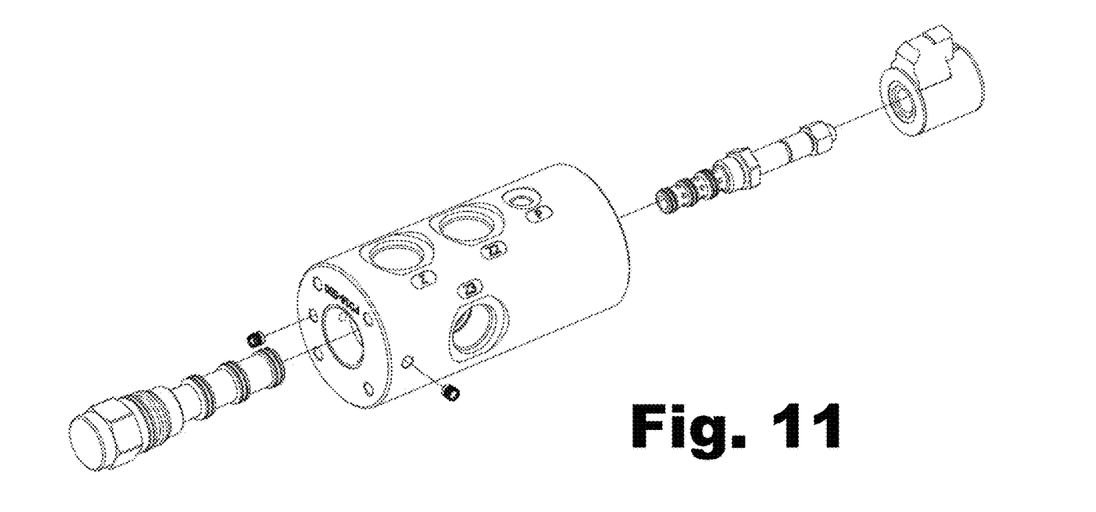
FIG. 11 is an exploded view of a speed round valve body assembly.
Figure 12:
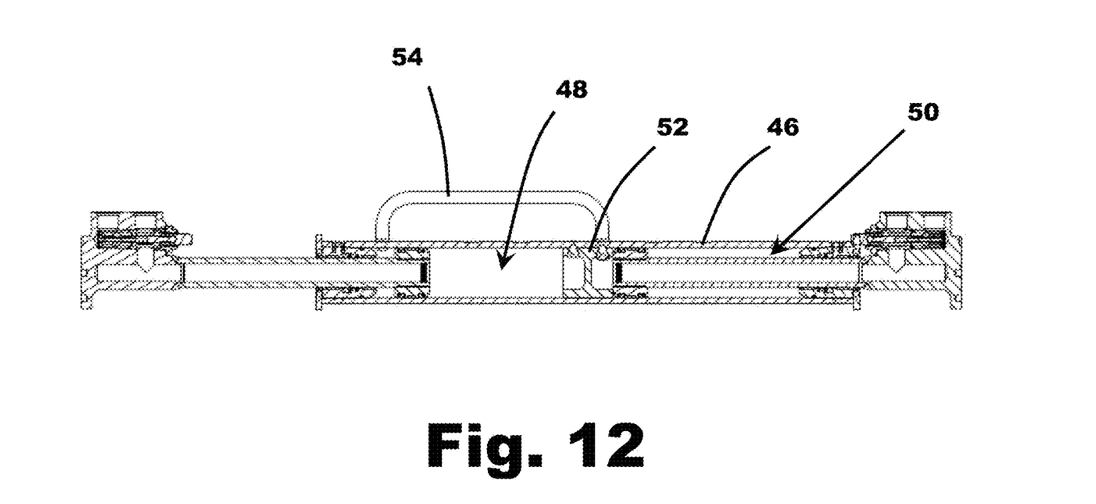
FIG. 12 is a side cross-sectional view of a barrel assembly.
Figure 13A:
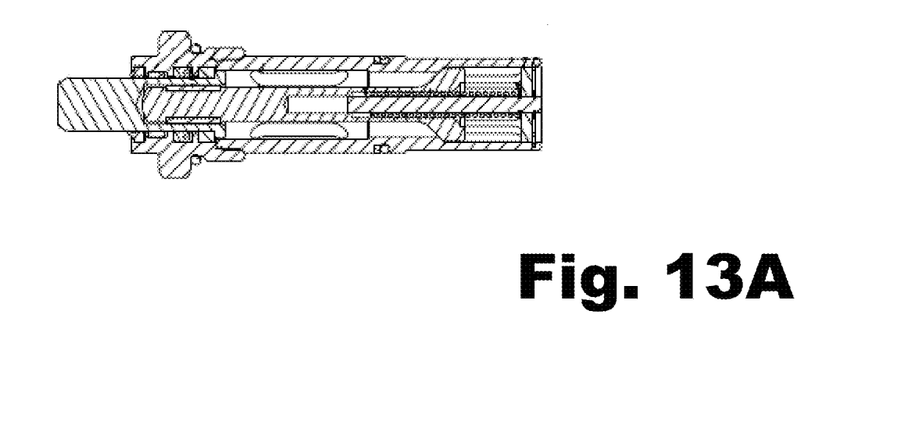
FIG. 13A is a side cross-sectional view of a check valve cartridge assembly.
Figure 13B:
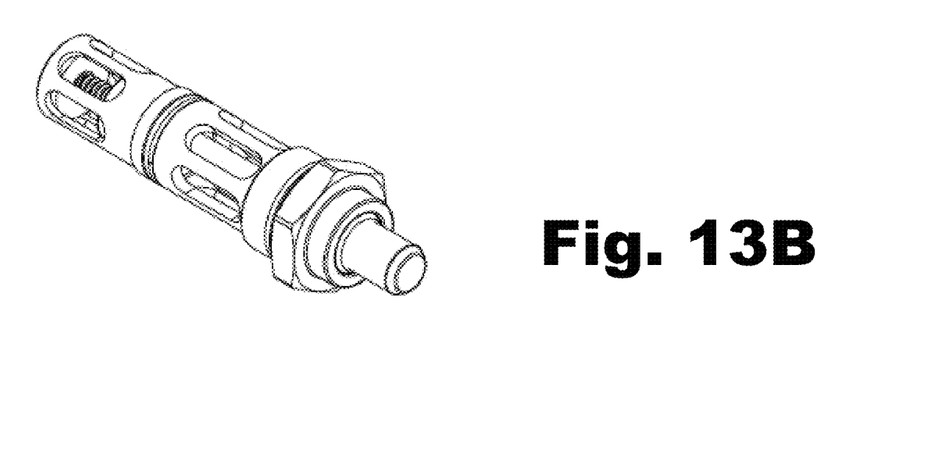
FIG. 13B is a pictorial view of the check valve cartridge assembly.
Figure 13C:
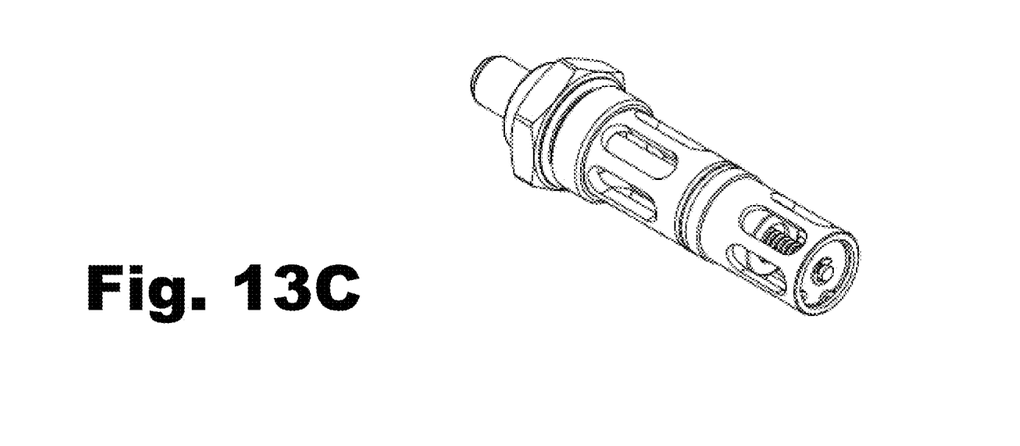
FIG. 13C is another pictorial view of the check valve cartridge assembly.
Figures 14A, 14B:
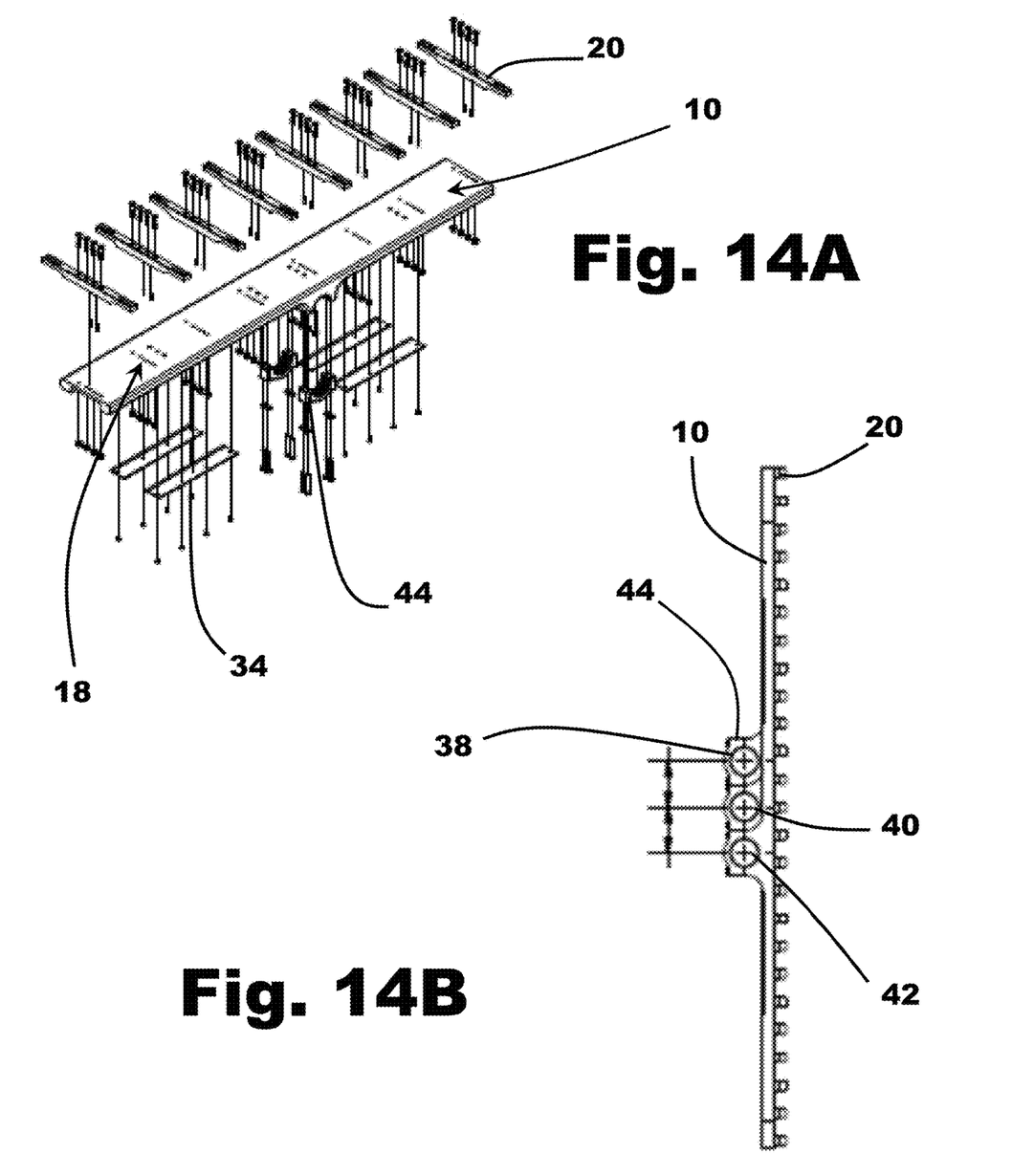
FIG. 14A is an exploded view of the aluminum cross-drive, with the drive shoes exploded from the cross-drive.
FIG. 14B is an unexploded side view of the aluminum cross-drive.
Figure 15:
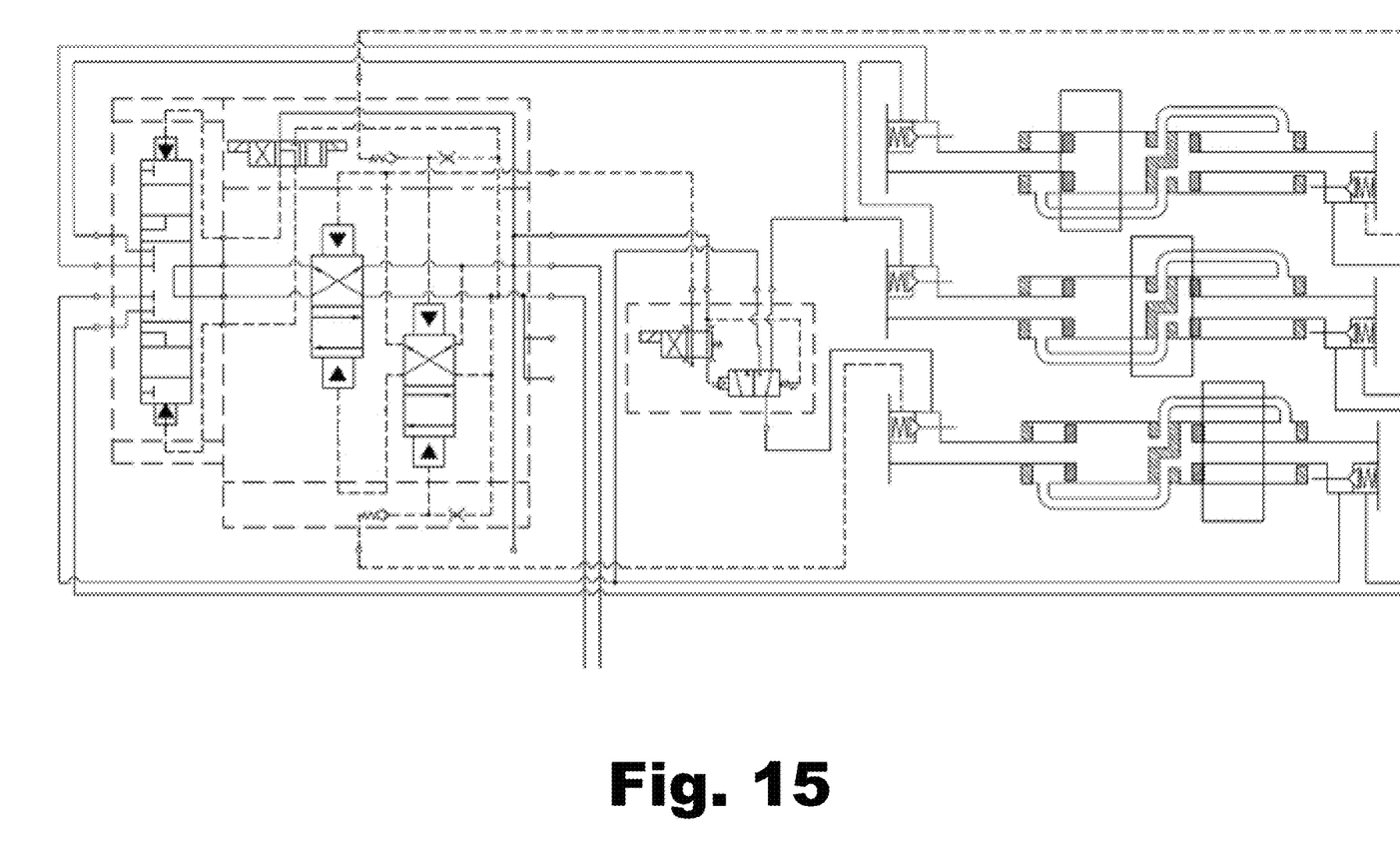
FIG. 15 is a hydraulic control valve schematic for the drive unit.
Figure 16:
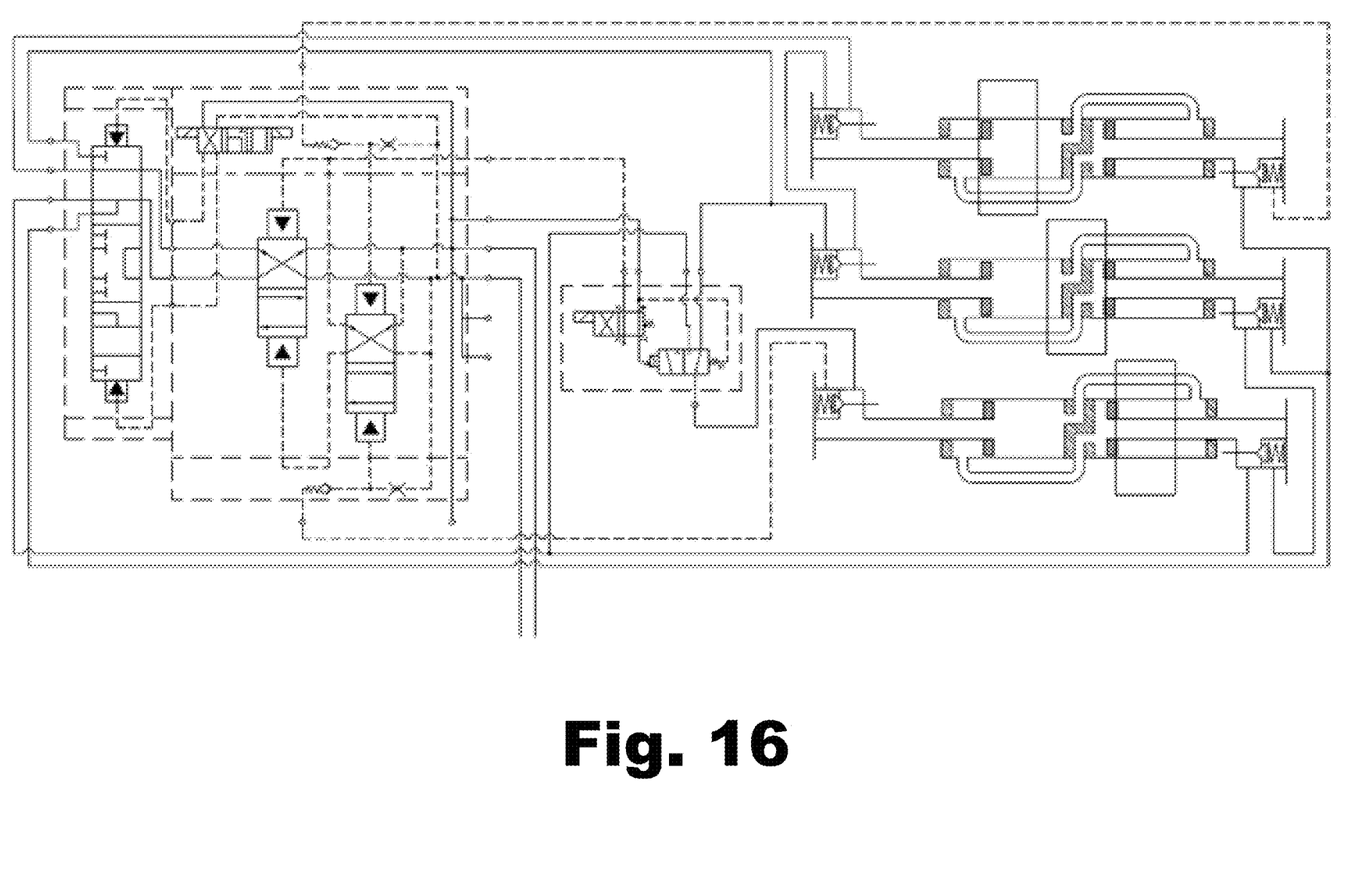
FIG. 16 is a hydraulic control valve schematic for the drive unit.
Figure 17:
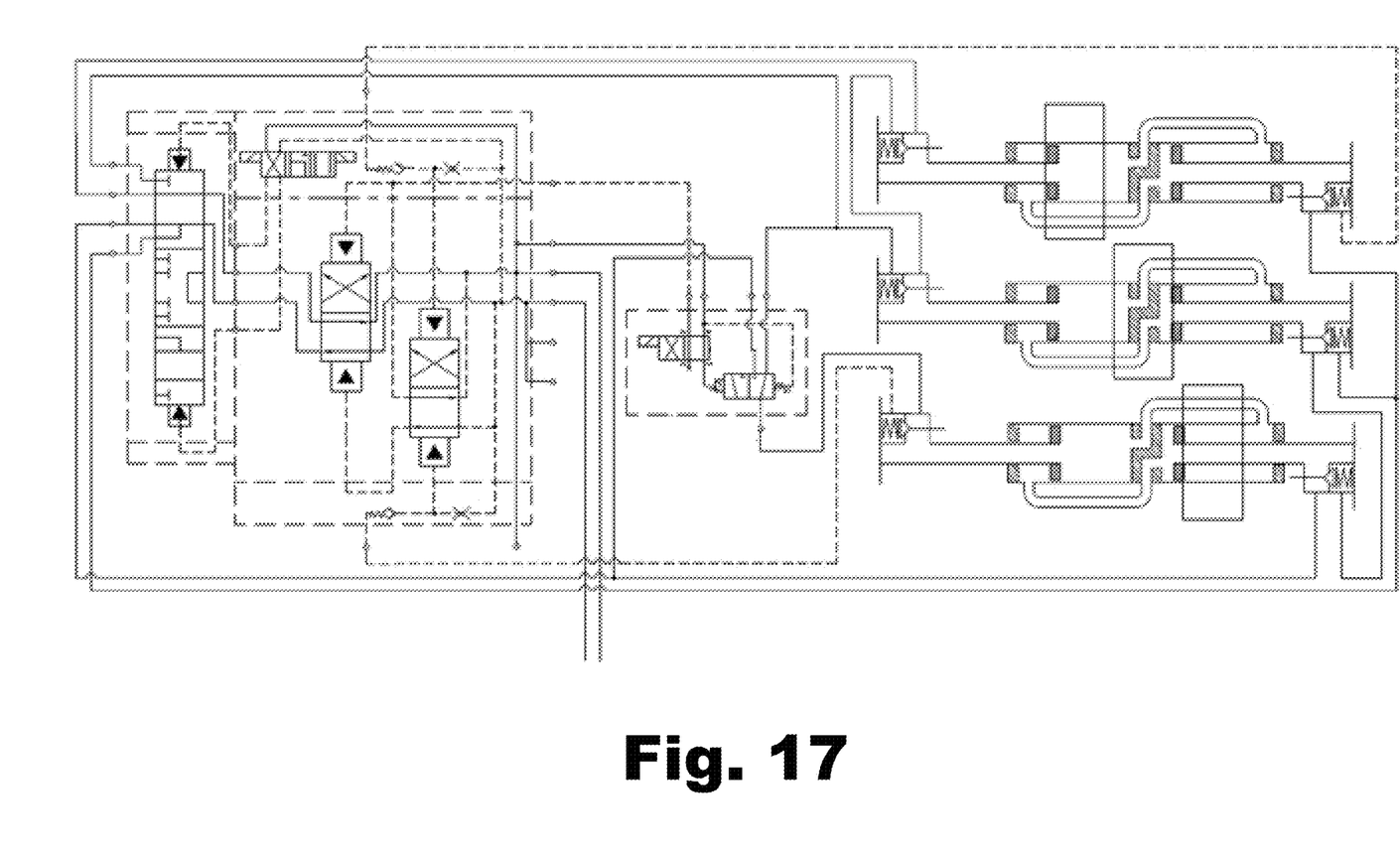
FIG. 17 is a hydraulic control valve schematic for the drive unit.

FIGS. 5A-5C provide the various views of the arrangement described above. FIG. 6 illustrates the drive unit frame without the hydraulic cylinders and other drive units. FIG. 7 illustrates the hydraulic cylinders 38, 40, 42 and related hydraulic components. FIGS. 8-10 and FIGS. 10A-10C illustrate various valve assembly components that are used to operate the drive unit. FIG. 12 illustrates a cross-section of the hydraulic cylinders. FIGS. 13A-13C illustrate a valve cartridge assembly that is used to operate the drive unit. FIGS. 14A-14B illustrate various components of the cross-drive members 10 described above. With respect to FIG. 14B, in particular, reference 44 illustrates how the hydraulic cylinders 38, 40, 42 are clamped to the drive unit 10. Last, FIGS. 15-17 provide control valve schematics for operating the drive unit.

The valve assembly includes a 6-way neutral center control valve. This eliminates need for a ball valve. It has two coils, one to enable unload, and one to enable load. This means that if there is an electrical failure in the coils, the control valve will default to the neutral position, shutting the drive off. There is also a vent to shift switching valve (VTS) that can shift at very low and very high speeds. The valve shifts when one of the vent lines is opened to tank, meaning that there should be less hydraulic shock to the system when switching from the conveying stroke (all together) to the restage stroke (1-2-3). Finally, a 2-speed valve is included in the assembly. This valve allows the drive to be switched from normal operation to a "high speed" mode. The valve allows the hydraulic oil in the #3 cylinder to loop to itself and tank. The hydraulic pressure is applied to only 2 cylinders instead of 3, increasing the speed of travel by a theoretical 16%. The #3 cylinder is pushed mechanically by the cross-drives.

Referring again to FIG. 12, the hydraulic cylinders described above have a barrel portion 46 that is divided into two chambers 48, 50 by a central barrier or plug 52 (also called a "center head"). The plug 52 is held in place by shrink-fitting it into the barrel (also called an "interference fit"). This enables the hydraulic cylinder to be made from a single barrel tube in lieu of two separate tubes that are welded together.

As discussed above, the cylinder barrel has machined grooves for the cross-drive clamps along with the interference fit center head described above. The interference fit is made as follows: The center head is cooled and the barrel is heated to create clearance between the two parts, and then the center head is placed into the barrel. As the barrel cools and the head expands, the interference fit is created, which holds the center head in place, and eliminates the need for welding the barrel together from two pieces. "Cross-over" tubes 54 are welded into the barrel.

The foregoing description is not intended to limit the scope of the patent right. The patent right is to be limited only by the patent claim or claims that follow. The disclosure of unclaimed matter is reserved for other patent claims in subsequent patent applications.

What is claimed is:

1. A hydraulic cylinder for use in a reciprocating floor conveyor system, comprising a barrel portion having a single barrel tube that is divided into two chambers by a central center head member, wherein the center head member is held in place inside said barrel tube by an interference fit, and wherein said interference fit comprises creating a temperature difference between said barrel tube and said center head member, with said center head member being cooler than said barrel tube, in a manner so that said temperature difference enables said center head member to be positioned within said barrel tube, followed by allowing said center head member to warm and said barrel tube to cool so that said center head is fixed in position inside said barrel tube.

* * * * *